(12) United States Patent
Reeder et al.

(10) Patent No.: US 6,192,031 B1
(45) Date of Patent: Feb. 20, 2001

(54) METHOD AND APPARATUS FOR CONTROLLING CALL ACCEPTANCE IN A TELECOMMUNICATIONS NETWORK

(75) Inventors: Anthony Andrew Reeder; Michael Anthony Gell, both of Suffolk; Rolando Antonio Carrasco, Staffordshire; Dominic Piers Greenwood, Essex, all of (GB)

(73) Assignee: British Telecommunications public limited company, London (GB)

( * ) Notice: Under 35 U.S.C. 154(b), the term of this patent shall be extended for 0 days.

(21) Appl. No.: 08/983,573
(22) PCT Filed: Jul. 18, 1996
(86) PCT No.: PCT/GB96/01728
  § 371 Date: Feb. 12, 1998
  § 102(e) Date: Feb. 12, 1998
(87) PCT Pub. No.: WO97/04606
  PCT Pub. Date: Feb. 6, 1997

(30) Foreign Application Priority Data

Jul. 21, 1995 (EP) ................................. 95305115
Oct. 11, 1995 (GB) ................................. 9520810

(51) Int. Cl.[7] ............... H04J 1/16; H04L 1/00; G01R 31/08; G06F 11/00
(52) U.S. Cl. .......................................... 370/230; 370/232
(58) Field of Search .................. 370/230, 231, 370/232, 233, 234, 468, 252, 253, 410, 235, 236, 237, 238

(56) References Cited

U.S. PATENT DOCUMENTS

| | | | |
|---|---|---|---|
| 4,931,941 | * | 6/1990 | Krishnan ........................ 701/118 |
| 5,042,027 | * | 8/1991 | Takase et al. ................... 370/252 |
| 5,142,570 | * | 8/1992 | Chaudhary et al. ............. 379/221 |

FOREIGN PATENT DOCUMENTS

| | | |
|---|---|---|
| 421583 | 4/1991 | (EP) . |
| 9115069 | 10/1991 | (WO) . |

OTHER PUBLICATIONS

Supercomm/ICC 92, vol. 2, Jun. 14, 1992, Chicago US, pp. 689–693, XP000326766 Verma et al.: "Variation of traffic parameters in ATM networks" see p. 689, left–hand column, paragraph 1–p. 690, left–hand column, paragraph 4.

* cited by examiner

Primary Examiner—David R. Vincent
(74) Attorney, Agent, or Firm—Nixon & Vanderhye P.C.

(57) ABSTRACT

A method and apparatus for controlling call acceptance in a telecommunications network. The volume of traffic being handled at a node of the network is periodically measured. For each measurement, a corresponding one of a set of storage locations is identified and the value stored in the identified location is incremented. An index of variation of measurement distribution is determined from the stored values in the set. In the event that the determined index exceeds a threshold value, calls for that node are re-routed or rejected.

25 Claims, 5 Drawing Sheets

METHOD AND APPARATUS FOR CONTROLLING CALL ACCEPTANCE IN A TELECOMMUNICATIONS NETWORK

This application is a 371 of PCT/GB96/01728, filed Jul. 18, 1996.

BACKGROUND OF THE INVENTION

This invention relates to a method and apparatus for controlling call connection in a telecommunications network.

SUMMARY OF THE INVENTION

Telecommunication networks are configured from nodes and links. Nodes comprise exchanges, bridgers, routers or other such equipment and links are the transmission paths between the nodes along which calls may be passed. Links are generally formed of optical fibre cable, co-axial cable or where radio or microwave communication is involved the links will not be physical components but logical communication channels.

Every component of a telecommunications network has a finite call carrying capacity. It is important that networks are managed to ensure that nodes and links are efficiently used to avoid overloading. Whether or not a call is routed from one node to another is decided by use of call acceptance methods.

The performance of every node will have an effect on the performance of the overall network and chaos as an example of flow dynamics is exhibited by the interactions between nodes.

Much publicity has been given over the past few years to chaos theory and chaotic phenomena are well known in the scientific community. Chaos is essentially characterised by a notion of sensitivity to initial conditions. A simple system such as a driven pendulum will respond to small differences in initial conditions by tracing trajectories with widely different paths that that may pass through periodic regimes and become chaotic. The resultant trajectory thus becomes unpredictable.

The performance of a network may be degraded in a similar way by small changes in performance of one or more of its components. The present invention arose in an attempt to alleviate this problem.

A call distribution system is known from EP-A-O 421 583 wherein at each node an activity level dependent upon the amount of traffic being handled by that node is calculated, and no node will re-route a call to a node having an activity level above a specific threshold level.

According to a first aspect of the invention there is provided a method of controlling call acceptance in a telecommunications network comprising periodically measuring the volume of traffic being handled at a node of the network; for each measurement, identifying a corresponding one of a set of storage locations and incrementing the value stored in the identified location; determining from the stored values in said set an index of variation of measurement distribution; and, in the event that the determined index exceeds a threshold value, intervening to re-route or reject calls for that node. By measuring the volume of traffic and determining an index of variation of measurement distribution it is possible to detect when the network is approaching a chaotic condition, that is to say becoming unstable. The greater the variation of measurement distribution the more chaotic the network is becoming.

According to a second aspect of the invention there is provided apparatus for controlling call acceptance in a telecommunications network, which apparatus comprises means to measure periodically the volume of traffic being handled at a node of the network; a set of storage locations; means to identify, for each measurement, a corresponding one of said set of storage locations and to increment the value stored in the identified location; means to determine from the stored values in said set an index of variation of measurement distribution; means to compare the index with a threshold value and to provide an output indicative of the comparison result; and means responsive to a comparison output indicative that the determined index exceeded the threshold value to re-route or reject calls for the node.

BRIEF DESCRIPTION OF THE DRAWINGS

A specific embodiment of the invention will now be described, by way of example only, with reference to the drawings in which.

DETAILED DESCRIPTION

Figure 1:
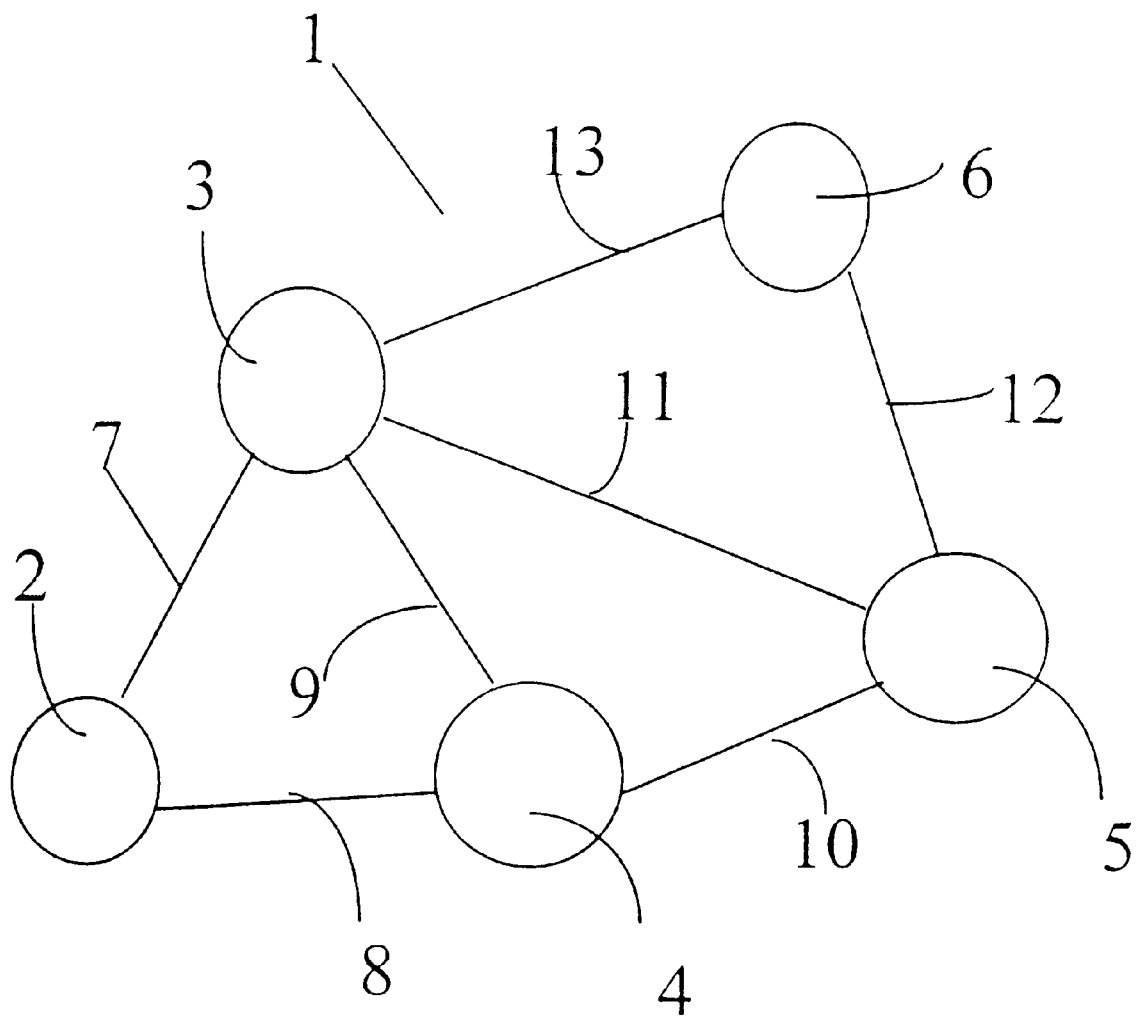
FIG. 1 shows a telecommunications network operating in accordance with the invention.

With reference to FIG. 1, there is shown a telecommunications network 1 comprising a number of network nodes 2 to 6 interconnected by links 7 to 13. The precise nature of the nodes and links will depend on the network but they may be multiplexers, switches and optical fibre. The operation of the network is governed by a network manager which may be a central function and disposed at a single node or a distributed function and distributed over a number of nodes, or each node may, in effect, manage itself, that is to say, each node incorporates a "node manager". For the purposes of this explanatory embodiment each node will include a manager to govern acceptance of calls onto the node. For node 2 the manager comprises a computer terminal of known type such as a Sun Microcomputer, marketed by Sun Corporation which is able to communicate with the other nodes by communication over the links 7 to 1 3. Thus, the links carry not only data from the nodes but also carry information from node to node.

Figure 2:
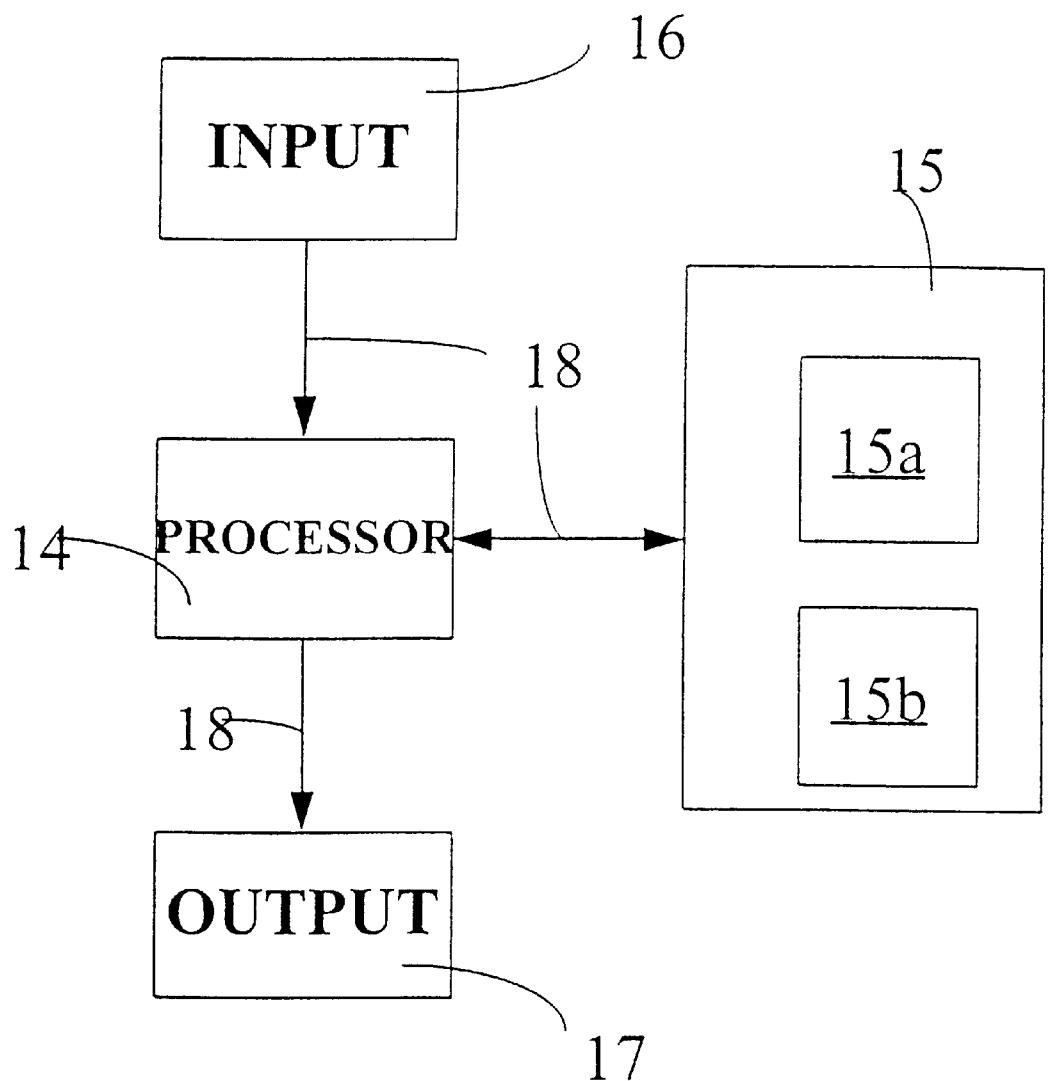
FIG. 2 shows in schematic block diagram form a node manager used in the network shown in FIG. 1.

FIG. 2 shows the main components of the computer terminal of node 2. The computer terminal comprises a microprocessor 14, a memory 15, an input device 16 and an output device 17. The input device 16, output device 17 and memory 15 are each connected to the microprocessor 14 by links 18 for the transmission of data and instructions, as is known in the computing art.

The memory 15 is configured into two main parts, 15$a$ and 15$b$. Memory part 15$a$ is allocated to hold a set of instructions governing the operation of the microprocessor 14. The instructions are held at addressable memory locations in the form of hexadecimal numbers.

Memory part 15$b$ is random access memory (RAM). This holds data on the operation of the node 2. The way in which the data is stored will be described more fully later.

The input device 16 allows the computer terminal to receive messages from other nodes and data concerning the network performance. It could also include a keyboard by means of which a user can interact with the computer terminal to modify the network operation.

The output device 17 allows the computer terminal to interact with the rest of the network 1. It could also include a visual display device (VDU) to display information to the user.

Figure 3:
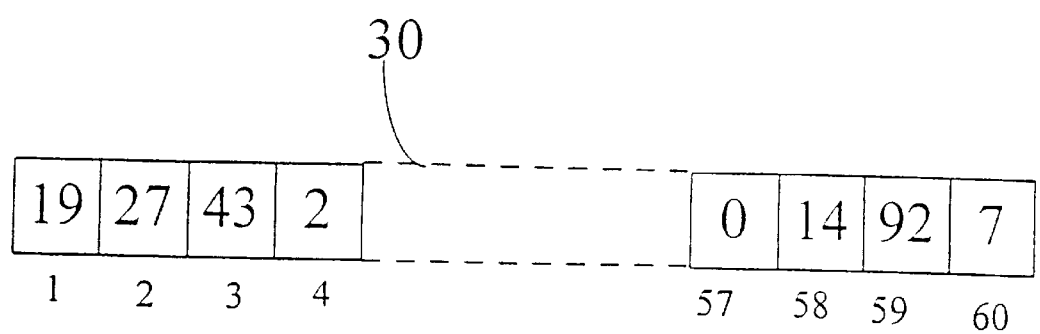
FIG. 3 is an explanatory diagram.

Memory part 15b includes a vector memory structure 30, as shown in FIG. 3. The vector structure 30 comprises an array of 60 locations. This number of locations is determined by the maximum number of packets that can pass through the node in a predetermined time interval, t, of approximately 1 msec and referred to as a measurement interval.

The way in which the node 2 controls call acceptance will now be described with reference to the flow-chart of FIG. 4.

The computer terminal performs a first step 40 to count the number of packets passing through the node in a measurement interval, and to increment the contents of the location of the vector structure 30 whose address has the same ordinal value as the value of the packet count. In other words, if the number of packets counted in the measurement interval was, say, three then the value stored in location number three of the vector structure 30 would be incremented. In effect, there is built up in the vector structure 30 over a period of time a histogram of the periodic measurement of the volume of traffic handled by the node (also called the load condition of the node or its activity).

FIG. 3 shows the state of part of the vector structure 30 after an arbitrary period (of several hundred measurement intervals) following a reset of all the locations to zero. It can thus be seen that in that period there were 19 measurement intervals in which only one packet was passed by the node, 27 measurement intervals in which only two packets were passed by the node, 43 measurement intervals in which only three packets were passed by the node, 2 measurement intervals in which only four packets were passed by the node, (the contents of locations 5 to 56, inclusive, are not shown), no measurement intervals in which only 57 packets were passed by the node, 14 measurement intervals in which only 58 packets were passed by the node, 92 measurement intervals in which only 59 packets were passed by the node, and 7 measurement intervals in which 60 packets were passed by the node.

A step 41 derives from the vector a dynamic activity index DAI (constituting an index of variation of measurement distribution of the present invention). This process will be described in greater detail later.

After the DAI has been calculated it is compared in step 42 with a threshold value held in memory part 15a. If the threshold value is not reached then the procedure goes back to step 40 to sample the load again, i.e. perform another measurement of packets passing in a time interval t, to update the vector structure 30. Steps 40, 41 and 42 are thus repeated until the threshold value is met, this being indicative that a chaotic condition is being approached, and at least some of the incoming calls are refused by the node in step 43. In variants, step 42 is arranged to determine whether the DAI exceeds the threshold.

In the specific embodiment a subsequent measurement interval is not started by step 40 until step 42 provides a trigger signal to step 40. So consecutive measurement intervals are spaced in time by the time taken by step 41 to calculate the DAI. In variants the spacing of the measurement intervals can be set by some other criterion, or a modified step 40 can continuously perform measurement intervals without spacing (contiguous intervals) and the "yes" output from step 42 used continuously to enable the modified step 40 while the DAI is below the threshold, the vector structure 30 being reset by step 44 via the "no" output when the threshold is met. With the speed of processing of current data processing apparatus the time taken for step 41 to calculate the DAI will be considerably less than the length of the measurement interval of step 40 so a new DAI will always be calculated at each update of the vector structure 30 by step 40. In variants having a large vector structure 30 step 41 may take longer than a measurement interval so the update information for the vector structure 30 will have to be held in store until step 44 is finished.

As mentioned, when step 42 determines that the threshold has been met, a step 44 resets the vector structure 30 to all zero condition and returns the processing to step 40. Step 43 is disabled for the first hundred cycles around the loop (steps 40, 41 and 42) following a reset of the vector structure 30. This avoids the first calculation of DAI, which will inherently be virtually zero (as will be seen from the calculation process described later), from causing node 2 to revert to accept calls when the network may still be in, or approaching, a chaotic condition. In variants, this initial period of disablement can be shorter or longer, depending on the size of the vector structure 30, and instead of the measurement intervals being contiguous they can be spaced by any suitable period so that the load activity measurement can be expressed as a duty ratio, for example the measurement being performed every tenth successive time interval (ten percent duty ratio).

The way in which the DAI is calculated will now be described. As mentioned, the node 2 has an output traffic flow over the range zero to sixty packets in each time interval t, but it will be noted that the vector structure 30 does not have a location for recording the number of measurement intervals in which no packets are passed by the node. This is because the DAI obtained when the vector structure includes such a zero packet location is not significantly different than when the location is not included. If desired, the vector structure 30 can include a zero packet location.

Figure 5:
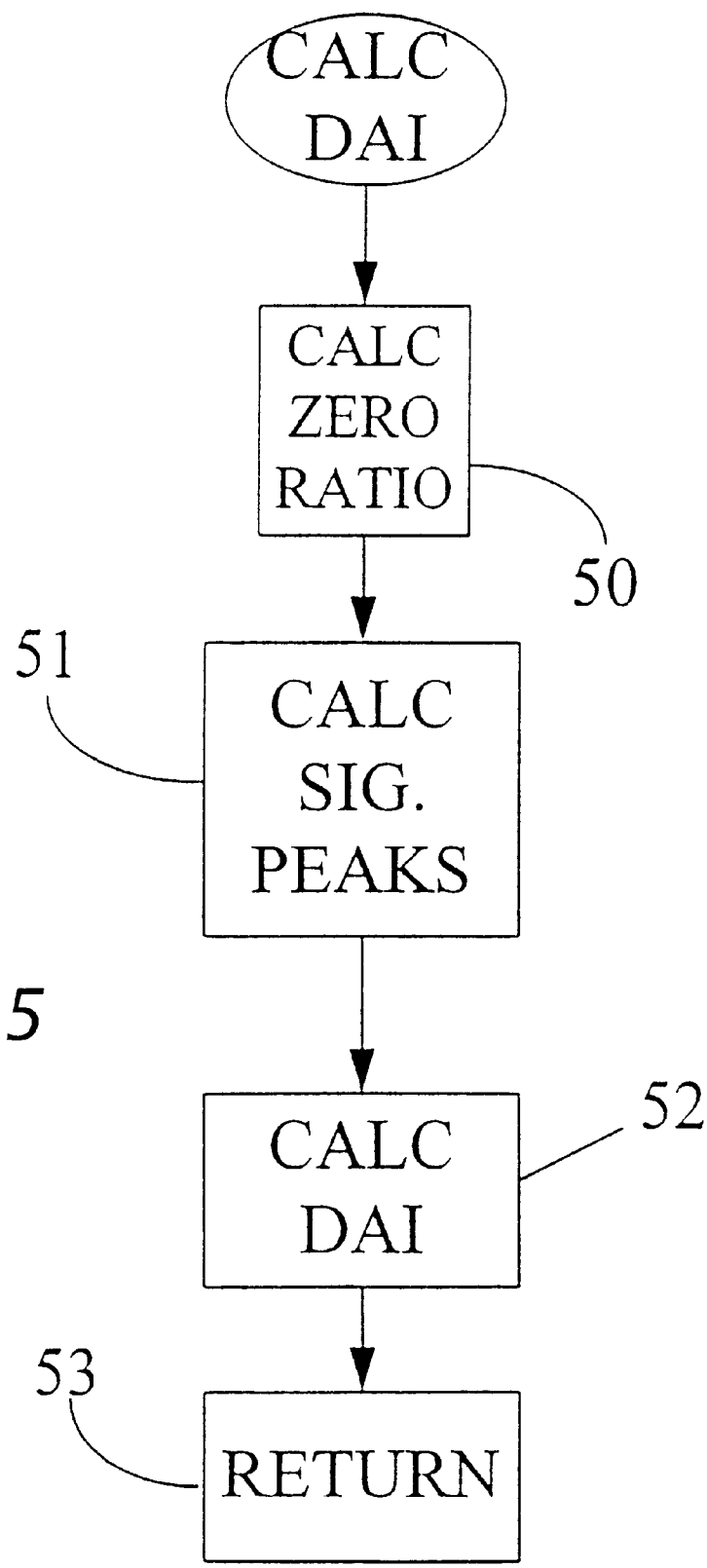

The flow-chart of FIG. 5 shows the DAI calculation process. A first step 50 in the process calculates a Zero Ratio. In this step, the number of locations in the vector containing zeros are counted. The Zero Ratio is then calculated from:

$$\text{Zero Ratio} = \frac{\text{Number of zero value locations}}{\text{Total number of locations}}$$

A second step 51 determines the number of peaks or maxima in the vector. In this step the contents of each location is compared in turn with the contents of its two neighbouring locations. If the contents of the current location is greater than the contents of its neighbours then there is a maximum at that location and that maximum can be thought of as a discrete maximum. In variants, a maximum is also detected if a group of adjacent locations all contain the same value which is greater than the contents of the group's two neighbouring locations, and such a maximum is referred to as a non-discrete maximum. The number of maxima of the Maxima ratio can be discrete maxima only, or can be the sum of discrete and non-discrete maxima.

A Maxima Ratio is then calculated using the formula:

$$\text{Maxima Ratio} = \frac{\text{Number of maxima detected}}{0.5 \times \text{total number of locations}}$$

The DAI is then calculated in step 52 from the equation $$DAI = \frac{(1.0 - \text{Zero Ratio}) + \text{Maxima Ratio}}{2}$$

Figure 4:
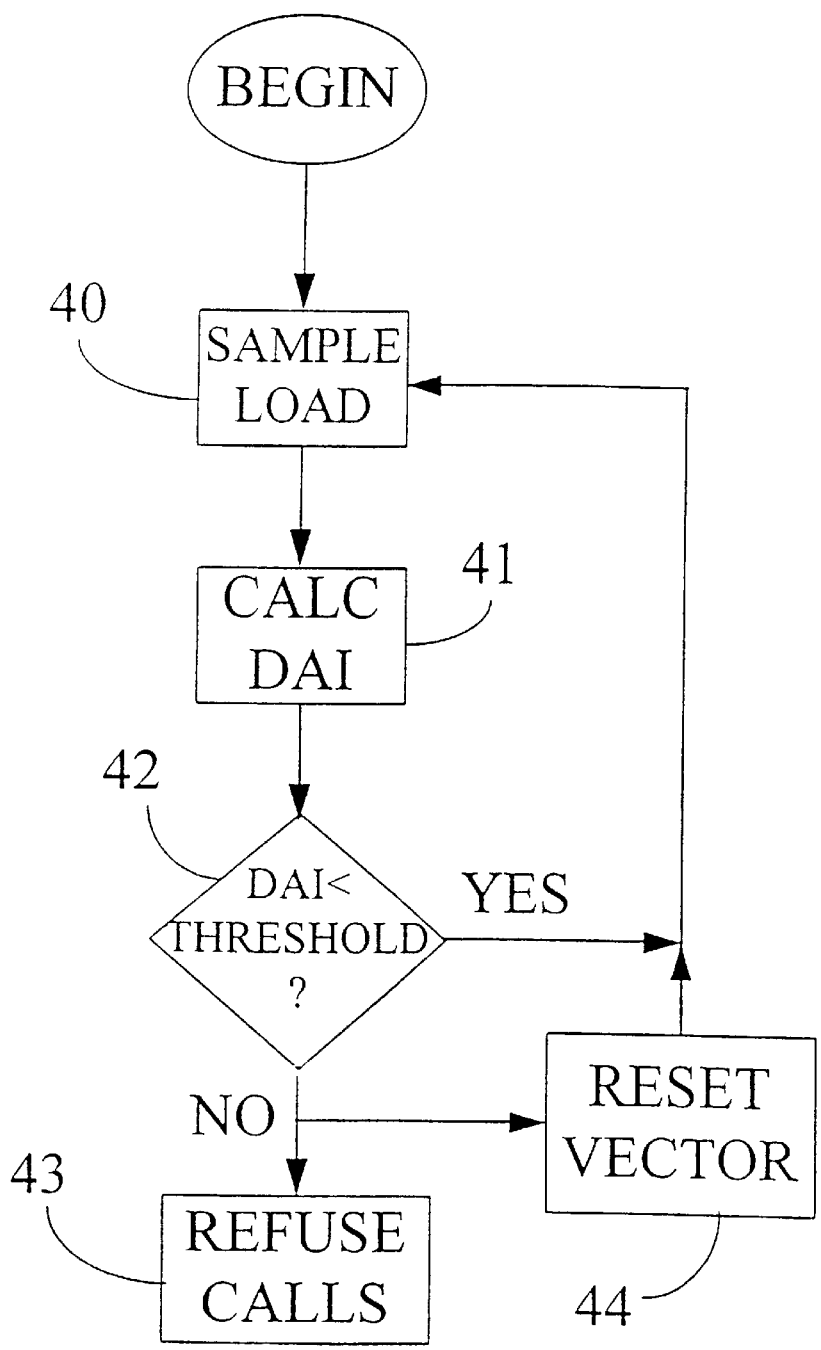
FIGS. 4 & 5 are flow-charts used in an explanation of the operation of the node manager shown in FIG. 2.

The procedure passes from step 52 in FIG. 5 to step 42 in FIG. 4, i.e. the value of the calculated DAI is compared with the threshold. In variants, an unnormalised form of DAI is generated by omitting the denominator (2), in which case the threshold value is doubled to compensate. It will thus be appreciated that it is sufficient for an activity index to be produced which is proportional to the numerator of the above expression for the DAI. Furthermore, in variants, the index can be formed of (1−Zero Ratio) only, or of the Maxima Ratio only.

In this embodiment the node 2 rejects calls. In alternative embodiments, this node passes its DAI to its neighbouring nodes which determine whether to route calls away from this node or to restrict the number of calls being routed to the node depending upon the value of the DAI. For example, if the DAI did not exceed a higher threshold (a neighbouring node performing a test similar to step 42), then the neighbouring node would send priority packets to node 2 but would reroute all other packets. Furthermore, where two or more of a node's neighbouring nodes have sent their respective DAIs, the node will decide on the basis of the DAIs whether rerouting is possible and, if more than one is available, will select the optimum reroute.

When the content of any location reaches a predetermined value (which can be the maximum, e.g. 255 if the location capacity is one byte, or a proportion of the maximum), the step 41 performs a preliminary substep of dividing the values of all the locations by two (or any other suitable divisor). In this way, if the node is in or approaching a stable condition of constant throughput, then as successive increments are made to the same location (or a small group of locations) then repeated operation of the division substep will cause other maxima eventually to be eliminated. If the division substep can reduce the content of a location to zero (when dividing the value one) then the Zero Ratio will increase and the DAI will be reduced due to changes in both its components.

In the described embodiment each node manages its own operation. In alternative embodiments, one node might be arranged to manage the network or a group of nodes in the network. The "managed" nodes would then pass their DAI to the manager node. Alternatively, instead of each node calculating its own DAI it could periodically pass its vector to its manager node, which is arranged to calculate all the DAIs for the nodes which it manages (network or group of nodes). A group manager node can generate a collective DAI, make a decision on whether to accept calls onto the group based on the value of the collective DAI, and send that decision to the managed nodes.

In variants, a different measurement interval can be used, and the vector structure can be of different length depending on both the measurement interval and the transmission rate, i.e. the rate at which the node can pass packets.

Although the above embodiment is concerned with data packets passing through a node of a packet switched network, the same principal can be applied to a network which employs circuit switching and in which calls exist as channels in a synchronous time frame. In such a case the node will determine how many of the channels are in use (carrying traffic data) in a measurement interval (which could be defined in terms of one or more transmission frames or as a predetermined length of time). A corresponding vector structure will be updated by incrementing the location whose address has the same ordinal value as the number of channels that are in use.

If in any particular network the maximum number of packets or in use channels in a measurement interval would be inconveniently large, either the measurement interval could be reduced or the measurements could be scaled for use with a vector structure having fewer locations, e.g. where the maximum value of the measurement is four times the number of locations in the vector structure, the actual measurement would be divided by four and rounded (up or down) to provide an integer number so that the corresponding location can be identified and incremented.

What is claimed is:

1. A method of controlling call acceptance in a telecommunications network comprising periodically measuring the volume of traffic being handled at a node of the network; for each measurement, identifying a corresponding one of a set of storage locations and incrementing the value stored in the identified location; determining from the stored values in said set an index of variation of measurement distribution; and, in the event that the determined index exceeds a threshold value, intervening to re-route or reject calls for that node.

2. A method as claimed in claim 1, performed as a distributed function at each of a plurality of nodes of the network, and wherein, when at one of said plurality of nodes the determined index exceeds said threshold value, said intervening is rejection of calls by that one of said plurality of nodes.

3. A method as claimed in claim 2, wherein the one of said plurality of nodes passes its determined index to at least one other one of said plurality of nodes of the network.

4. A method as claimed in claim 3, wherein the at least one other one of said plurality of nodes each makes a routing decision based, at least in part, on a received determined index.

5. A method as claimed in 4, wherein a node receives a plurality of said indices and makes said routing decision based, at least in part, on said received plurality of indices.

6. A method as claimed in claim 1, wherein said index is a function of the proportion of the locations whose contents are a positive integer.

7. A method as claimed in claim 1, wherein said index is a function of the number of locations whose contents are greater than those of their respective neighboring locations.

8. A method as claimed in claim 6, wherein said index is also a function of the number of locations whose contents are greater than those of their respective neighboring locations.

9. A method as claimed in claim 1, including the step of dividing the contents of all the locations by a common numerical value.

10. A method as claimed in claim 9, wherein the dividing step is performed periodically.

11. A method as claimed in claim 9, wherein the dividing step is performed when the contents of any of the locations reach a predetermined amount.

12. Apparatus for controlling call acceptance in a telecommunications network, which apparatus comprises means to measure periodically the volume of traffic being handled at a node of the network; a set of storage locations; means to identify, for each measurement, a corresponding one of said set of storage locations and to increment the value stored in the identified location; means to determine from the stored values in said set an index of variation of measurement distribution; means to compare the determined index with a threshold value and to provide an output indicative of the comparison result; and means responsive to a comparison output indicative that the determined index exceeded the threshold value to re-route or reject calls for the node.

13. Apparatus as claimed in claim 12, arranged for distributed operation at each of a plurality of nodes of the network, and wherein each one of said plurality of nodes has a respective measuring means; a respective set of storage locations; a respective identifying and incrementing means; a respective determining means; a respective comparing and providing means; and a respective means responsive to a comparison output indicative that the determined index exceeded the threshold value and arranged to reject incoming calls.

14. Apparatus as claimed in claim 13, and comprising, at each one of said plurality of nodes, a respective means to pass its determined index to at least one other one of said plurality of nodes.

15. Apparatus as claimed in claim 14, wherein the at least one other one of said plurality of nodes comprises means to make a routing decision based, at least in part, on a received determined index.

16. Apparatus as claimed in claim 14, wherein the at least one other one of said nodes comprises means responsive to receipt of a plurality of said indices to make said routing decision based, at least in part, on said received plurality of indices.

17. Apparatus as claimed in claim 12, wherein said determining means is arranged to provide said index as a function of the proportion of the locations whose contents is a positive integer.

18. Apparatus as claimed in claim 12 wherein said determining means is arranged to provide said index as a function of the number of locations whose contents are greater than those of their respective neighboring locations.

19. Apparatus as claimed in claim 17, wherein said determining means is arranged to provide said index also as a function of the number of locations whose contents are greater than those of their respective neighboring locations.

20. Apparatus as claimed in claim 12, wherein said determining means is arranged to divide the contents of all the locations by a common numerical value.

21. Apparatus as claimed in claim 20, wherein said determining means is arranged to perform the division of the contents of all the locations periodically.

22. Apparatus as claimed in claim 20, wherein said determining means is arranged to perform the division of the contents of all the locations when the contents of any of the locations reach a predetermined amount.

23. In a telecommunications network comprising a plurality of nodes, at least some of which are configured for controlling call acceptance, a method comprising:

maintaining, for each controlled node, a respective set of storage locations, each storage location of the set of storage locations for a particular controlled node corresponding to a respective count indicative of a volume of traffic at that controlled node;

periodically measuring the volume of traffic being handled at the controlled nodes;

for each measurement at the controlled nodes, identifying a storage location of the respective set of storage locations that corresponds to the measured volume of traffic and incrementing the value stored in the identified storage location, the value stored in each storage location thereby being indicative of the number of times the volume of traffic is measured to be a particular count;

determining from the stored values in said respective sets of storage locations an index of variation of measurements distribution for each controlled node; and in the event that the determined index for particular ones of said controlled nodes exceeds a threshold value, intervening to re-route or reject calls for those particular nodes.

24. A method as claimed in claim 23, further comprising:

one or more of said controlled nodes communicating its determined index to other ones of said controlled nodes.

25. A method as claimed in claim 24, wherein call acceptance decisions of the ones of said controlled nodes to which determined indices are communicated are based, at least in part, on the indices communicated thereto.

* * * * *